United States Patent [19]

Satake

[11] Patent Number: 4,785,213

[45] Date of Patent: Nov. 15, 1988

[54] VARIABLE SPEED CONTROLLED INDUCTION MOTOR

[75] Inventor: Toshihiko Satake, Higashihiroshima, Japan

[73] Assignee: Satake Engineering Co., Ltd., Tokyo, Japan

[21] Appl. No.: 55,147

[22] Filed: May 28, 1987

[30] Foreign Application Priority Data

May 30, 1986 [JP] Japan ................................. 61-127094
Jun. 2, 1986 [JP] Japan ................................. 61-128314

[51] Int. Cl.⁴ .......................... H02P 4/14; H02P 13/10
[52] U.S. Cl. .................................... 310/116; 310/114; 310/191; 318/437
[58] Field of Search ............... 310/112, 114, 116, 118, 310/122, 191, 209, 115; 322/35, 47; 318/437, 538, 539, 540, 771

[56] References Cited

U.S. PATENT DOCUMENTS 3,405,296 10/1968 Stilley et al. .................... 310/116
3,940,668 2/1976 Apsit et al. ..................... 318/771
4,228,391 10/1980 Owen .............................. 310/112

FOREIGN PATENT DOCUMENTS 49-86807 8/1974 Japan .................................. 310/114
54-29005 3/1979 Japan .................................. 310/114

Primary Examiner—Patrick R. Salce
Assistant Examiner—D. S. Rebsch
Attorney, Agent, or Firm—Wegner & Bretschneider

[57] ABSTRACT

A variable speed controlled induction motor has a rotor (8) formed in one piece and a plurality of stators (24,25), the rotor having a plurality of rotor cores (2,3) and a plurality of conductive members (5) interconnected and the stators having respective stator windings (22,23). The stator windings (22,23) are connected in series, the rotor conductive members (5) are short-circuited by connecting members (r) at an air space or a non-magnetic core portion disposed between the rotor cores (2,3), and at least one of the plurality of stators (24,25) is associated with a phase shifter (38;47;50;51) providing the voltage of a given phase to the stator windings, whereby the rotational speed can be controlled easily over a wide range with excellent torque characteristics and efficiency.

12 Claims, 13 Drawing Sheets

VARIABLE SPEED CONTROLLED INDUCTION MOTOR

BACKGROUND OF THE INVENTION

The present invention relates to a variable speed controlled induction motor in which the torque characteristics and efficiency are good and control of its speed is easy.

One of the conventional methods for controlling the speed of an induction motor is to vary the power supply frequency. Although this method enables the speed to be controlled continuously over a wide range, it requires a high cost frequency converter. Further, such a frequency converter, in the course of converting the AC current to DC current and back to AC current, may produce high harmonic noise and other electromagnetic waves which, if they flow into the commercial power lines, would cause various high harmonic noise problems, and malfunctioning of computers or other electronic devices, heating of capacitors, etc. As for the high harmonic noise problems, they may be eliminated if an appropriate high frequency filter is provided, but this also is expensive. Also, this method has drawbacks in that, in general, the motor does not operate efficiently at lower speeds.

A method by which the number of poles of the induction motor is varied in operation does enable the speed to be controlled, but only step-wise, and thus the control is neither continuous nor smooth.

A method by which the supply voltage is varied enables the speed to be controlled continuously but there is a drawback in that the motor does not operate efficiently at low speed ranges.

A method by which, in a wound rotor type motor, the secondary insertion resistance is varied, to vary the slip enables the speed to be continuously controlled comparatively easily but, since a resistance is inserted in the rotor winding circuits from the outside through brushes and slip rings, there is a drawback in that it is necessary to make periodic checks and perform careful maintenance of these brushes and slip rings. In induction motors of the squirrel-cage rotor type, a problem is that it is not possible to vary the second resistance in order to effect wherein the second resistance is varied in order to effect the control of speed.

Prior art which attempted to solve the above problems in available. For example, Unexamined Japanese patent publication No. 29005/1979 discloses an arrangement in which squirrel-cage conductors are disposed so that they extend along a pair of rotor cores, and both ends of these conductors are respectively short-circuited by means of short-circuit rings and in which a high resistor is disposed in such a way that the squirrel-cage conductors are short-circuited at a middle region of the conductors between the two rotor cores. Windings are provided on stators which are independent the corresponding rotor cores. In this squirrel-cage rotor induction motor, the phases are displaced by 180° between the windings of the stators at the start of rotation, but when the motor is in operation after starting, the phases are reversed to be in phase with each other. Because of the phase displacement by 180° between the windings of the stators upon starting, the starting torque increases so as to enhance the starting characteristics. However, during normal operation, as the phases of the stator windings are the same, it operates under normal torque characteristics. Therefore, although the starting characteristics may be recognized as improved, this motor is not a controllable speed motor and cannot be used as a drive motor for a load which requires variation in speed.

Unexamined Japanese patent publication No. 29005/1979 includes an example in which, in order to soften the shock which may otherwise be caused by the sudden change in torque in transition from the starting to the normal operation of the motor, the connection of the respective windings of the stators to the power supply circuit is momentarily put in series as an intermediate step to the full operation of the motor. This arrangement is limited to the displacement to either 0° or 180° of the phase of the rotating magnetic fields and is in no way intended to be used for varying speed. When the connection is changed to a series connection, the voltage applied to the stators is reduced by half, which means that the torque is reduced to ¼. It is clear from this that with the arrangement disclosed in this published application it is impossible to effect the control of variations of speed.

Thus, although Unexamined Japanese patent publication No. 29005/1979 includes reference to series connection by stating that there ". . . may be an intermediate step of switching the windings of the stators between the series connection and the parallel connection with respect to the power supply circuit", it must be considered that this series connection has nothing to do with, and does not do anything for the purpose of speed control.

Unexamined Japanese patent publication No. 86807/1974 discloses a non-synchronous motor having a squirrel-cage rotor and a stator of multi-phase windings. It includes conductive bars, short-circuit end rings and ferro-magnetic layers. The stator is divided into first windings and second windings. These first and second windings are disposed coaxially adjacent to each other and adjacent to different portions of the rotor. AC current of the same frequency may be supplied. There is also provided a means to vary the power induced in the windings of the rotor by the second windings of the stator. In this motor, either by mechanical means or electrical means, it is possible to establish a phase difference between the two divided portions of the stator and to change to some extent the rotational speed of the rotor. However, except during the period in which the phase angle between the two divided stator portions is in the same phase, the torque is so small that the motor immediately stops when the load thereto becomes large and this makes the motor unsuited for practical use. Thus, this motor cannot be used in a situation where the motor needs to be repeatedly and frequently started and stopped under the state in which the motor is kept loaded, which means that this motor has not solved the abovementioned problems.

The present invention aims at overcoming the problems seen in the prior art and achieving advantages which cannot be obtained even by the combination of the above explained Unexamined Japanese patent publication No. 29005/1979 and Unexamined Japanese patent publication No. 86807/1974, such as the achieving of special torque characteristics, the possibility of setting any desired speed in a wide range of smoothly controlled speeds, and the possibility of starting the motor at any desired torque. In the variable speed induction motor of the present invention, the torque characteristics are excellent and have high efficiency. These are achieved due to the application of a rating current approximately the same as that applied during the full rotation speed operation of the motor over a wide speed range from starting to the full rotation speed.

The variable speed controlled induction motor of the present invention may be used with either a single-phase power source or three-phase power source. The form of the rotor may normally be of any type such as squirrel-cage, a double squirrel-cage, a deep-slot squirrel cage, a special squirrel-cage or a wound type. The conductors or conductive members used in the description of the present invention generally refer to those provided in the rotor cores of the squirrel-cage type and windings wound on the rotor cores of the wound type.

According to the present invention there is provided a variable speed controlled induction motor comprising: a rotor formed in one piece having a plurality of rotor cores mounted, with a predetermined space being provided therebetween, on a common axis and having a plurality of conductive members interconnected and respectively mounted on the rotor cores; a plurality of stators disposed side by side and surroundingly facing the respective rotor cores and having stator windings wound respectively on the stators and connected in series; connecting members short-circuiting the conductive members at an air space or non-magnetic core portion disposed at the space between the rotor cores; and phase shifting means for producing phase differences between the voltages induced on the portions of the conductive members which face one of the plurality of stators and the voltages induced on the corresponding portions of the conductive members which face another one of the stators.

According to the present invention, it is possible to change the rotational speed of the rotor by means which enables creation of a displacement in the flux of the magnetic fields generated between the respective stators and the rotor, and by means by which the voltage induced in the rotor conductive members is controlled so as to be increased or decreased according to the displacement in the phase of the magnetic fields.

The arrangement wherein the respective windings wound on a plurality of stators are connected in series and the arrangement wherein a plurality of the conductive members mounted on a plurality of rotor cores are short-circuited through respective connecting members to produce the following two functions. One function is that the amount of current which flows in the rotor conductive members based on the voltages induced at those portions of the rotor conductive members which correspond to the respective stators becomes the same, and the other function is that the current corresponding to the amount of the vector difference caused by the phase difference of the voltages between the stators flows through the connecting members, short-circuiting a plurality of the rotor conductive members. By the synergistic effects of these two functions, the extent to which the resistance has an effect on the current flows, based on the phase difference $\theta$ of the voltages, can be completely controlled. In other words, by varying the phase difference $\theta$, the ratio between the current which flows in the rotor conductive members and the current which flows in the connecting members can be controlled independently of the slip. As a result of this, when the amount of the phase difference $\theta$ is controlled up and down, the function of the connecting members connecting the rotor conductive members is controlled in a desired amount and in a stable manner so that it is possible to obtain a large stable torque, not only at the starting of the motor, but also through a wide range from low speed operation, to high speed operation, thereby improving the overall efficiency.

DESCRIPTION OF THE PREFERRED EMBODIMENTS

The embodiments of the present invention are explained with reference to FIGS. 1-19.

Figure 1:
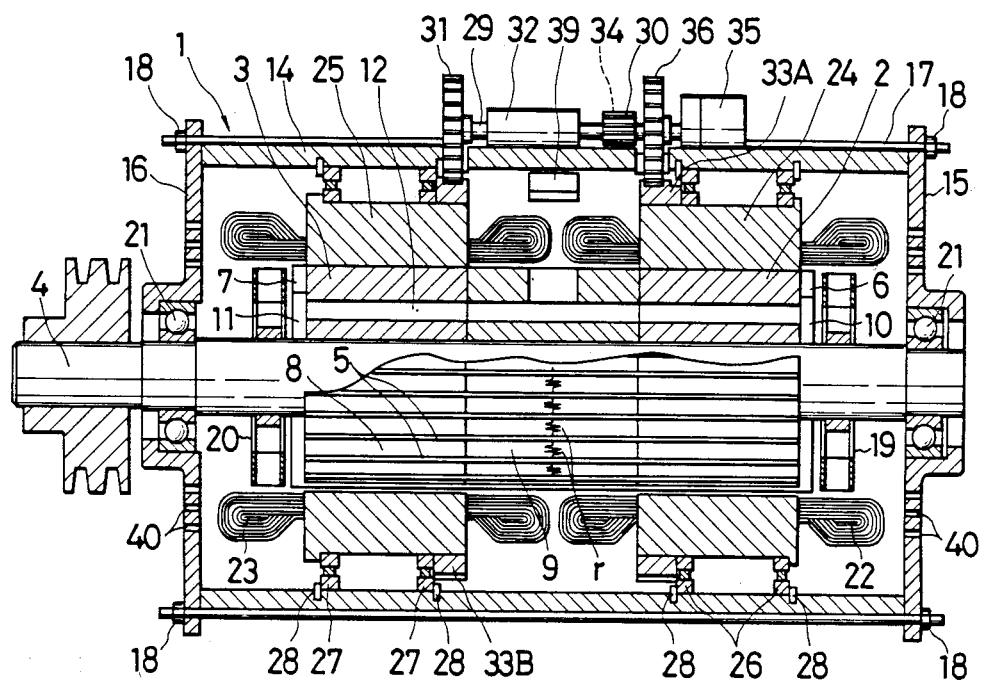
FIG. 1 is a sectional side elevation of the induction motor according to the present invention.
Figure 2:
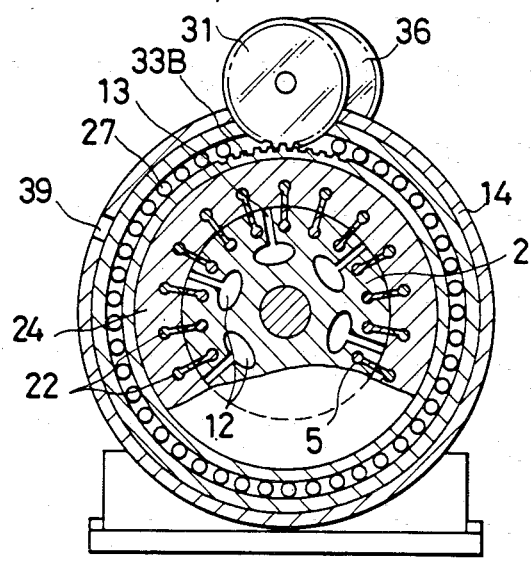
FIG. 2 is a transverse sectional view of the rotating means for the stators.
Figure 3:
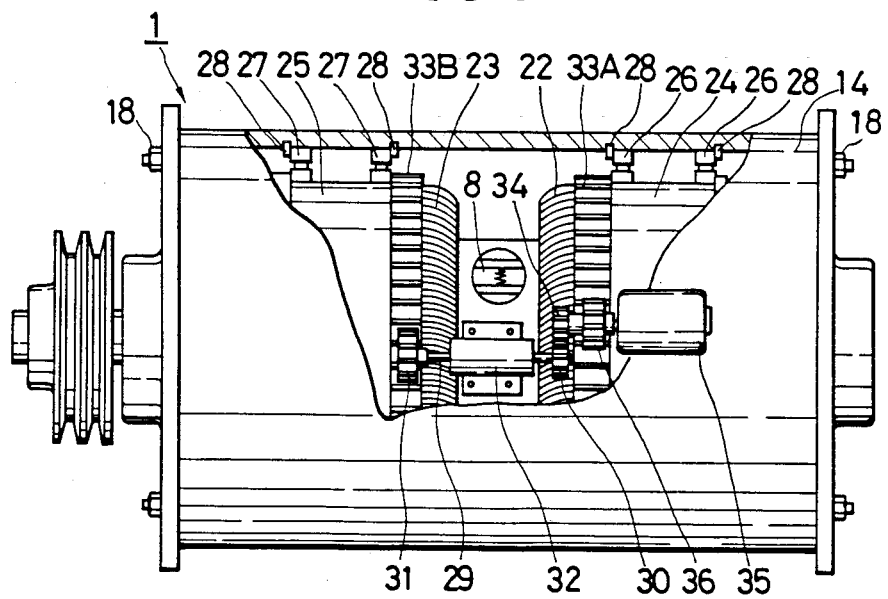
FIG. 3 is a top view, partly in broken section, of the rotating means for the stators.

A first embodiment is hereinafter explained by making reference to FIGS. 1-4. In FIGS. 1 and 3, the numeral 1 represents an induction motor which is arranged as explained below. Iron rotor cores 2, 3 are mounted on a rotor shaft in a spaced relation and a non-magnetic core 9 is interposed between the rotor cores 2, 3. A plurality of conductive members 5 provided on the rotor cores 2, 3 are connected in series, thereby forming a one-unit rotor 8, and both ends of the conductive members 5 thus connected in series are short-circuited by short circuit rings 6, 7. The rotor cores 2, 3 and the non-magnetic core 9 have air passages 12 which extend to both end portions 10, 11 of the rotor 8. There are provided a plurality of air passage holes 14 which extend from air passages 12 to the outer periphery of the rotor 8 (See FIG. 2). The conductive members 5 provided on the rotor 8 are short-circuited at the region of the non-magnetic core 9 interposed between the rotor cores 2, 3 by connecting members r through which currents of any vectors with differences flow, that is, by resistors or resisting members r of nichrome wire, steel with carbon content, conductive ceramic, etc. As is apparent from FIGS. 1 and 3, at both ends of a machine frame 14 in a cylindrical shape, bearing bases 15, 16 are fastened to a connecting bar 17 by nuts 18 for forming a unitary assembly. Both ends of the rotor 8 are provided with cooling fans 19, 20 and both ends of the rotor shaft 4 are axially supported by bearings 21, 22 which are provided in the respective bearing bases 15, 16, thereby allowing the rotor shaft 4 to rotate freely.

A first stator 24 having windings 22 and a second stator 25 having windings 23 are disposed on the machine frame 14 side by side at respective outer regions facing the respective rotor cores 2, 3. Between the machine frame 14 and the first stator 24, as well as the second stator 25, there are provided contact bearings 26, 27 which are fixed by the stop-rings 28 on the machine frame 14. As will be noted from FIGS. 2 and 3, gears 33A, 33B are provided on outer surfaces of the first stator 24 and the second stator 25.

A pulse motor 35 is mounted at an outside portion of the machine frame 14 and a first driving gear 36 and a transmission gear 34 which are formed in a unit are fixedly mounted on a driving shaft. A bearing base 32 which rotatably supports a transmission shaft 29 having a transmission gear 30 and a second driving gear 31 is mounted on an outside portion of the machine frame 14. The first driving gear 36 and the second driving gear 31 extend into the machine frame 14 through openings 37, 37 provided in the machine frame 14, and engage respectively with the gear 33A on the first stator 24 and the gear 33B on the second stator 25. With this arrangement, the first stator 24 and the second stator 25 rotate coaxially with respect to the rotor 8 by the operation of the pulse motor 35. A phase shifting means 38 is made up of the first stator 24 and the second stator 25. The numeral 39 represents exhaust openings provided in an outer periphery portion of the machine frame 14 and the numeral 40 represents air passage holes provided in the bearing bases 15, 16.

Figure 4:
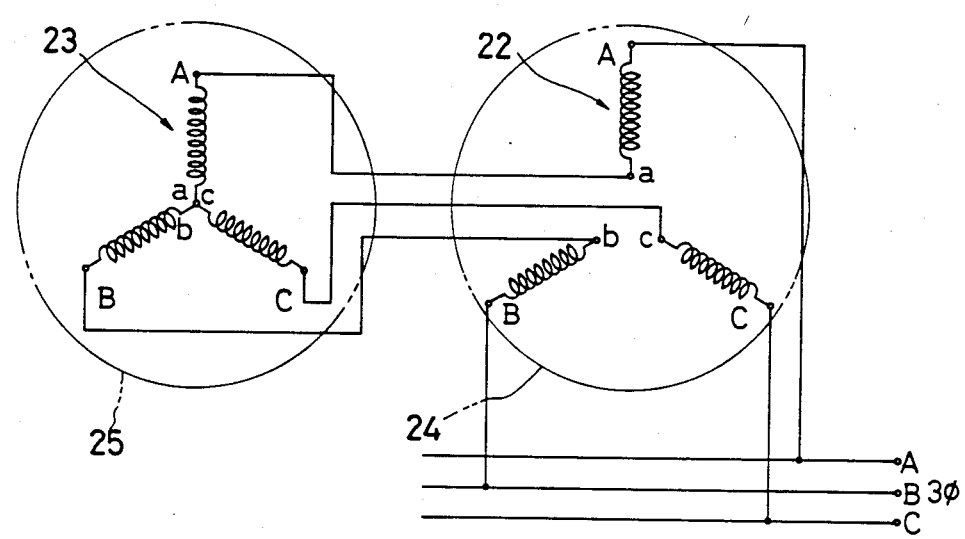
FIG. 4 is a wiring diagram of the stator windings connected in series.

Now reference is made to FIG. 4 to explain the connections of the windings 22, 23 wound respectively on the first stator 24 and the second stator 25. Windings 23 in the form of a star-connection provided on the second stator 25 are connected in series to respective windings 22 of the first stator 24 and then connected to the power source. That is, terminals A, B, C of the windings 22 of the first stator 24 are connected to lines A, B, C of a three-phase commercial power source, terminals a, b, c of the windings 22 are connected to terminals A, B, C of the windings 23 of the second stator 25, and terminals a, b, c of the windings 23 are connected together so as to be short-circuited.

The functions of the motor as arranged above are hereinafter explained.

When the power is fed to the windings 22 of the first stator 24 from the three-phase commercial power source, the rotating magnetic fields are generated around the stators 24, 25 so that the current flows through the conductive members 5 of the rotor 8 and thus the rotor 8 is rotated. When the amount of rotation of the second stator 25 with respect to the first stator 24 is zero, there is no phase displacement in the flux of the rotating magnetic fields generated around the respective stators 24, 25. Thus, as explained later, the current does not flow in the resisting members or connecting members r, so that the torque characteristics will become the same as those produced in ordinary induction motors.

Next, explanation will be made of the function which takes place when the pulse motor 35 is operated and the first stator 24 and the second stator 25 are respectively rotated in an opposite direction by $\theta$ in terms of an angle of phases. The phase of the fluxes $\phi_1$, $\phi_2$ of the rotating magnetic fields generated by the first stator 24 and the second stator 25 which constitute the phase shifting means 38 will be displaced by $\theta$ so that the phase of the voltages $\hat{e}_1$, $\hat{e}_2$ induced in the conductive members 5 of the rotor 8 by the first stator 24 and the second stator 25 will also be displaced by $\theta$. Now, let us assume that, if the voltage $e_2$ induced in the conductive members 5 of the rotor 8 by the second stator 25 is taken as reference, this voltage is $\hat{e}_2 = SE$. Here, S represents slip and E represents the voltage induced when the slip is 1. The voltage $e_1$ induced in the conductive members 5 by the first stator 24 then will be $\hat{e}_1 = SE\hat{e}^{j\theta}$.

Figure 5:
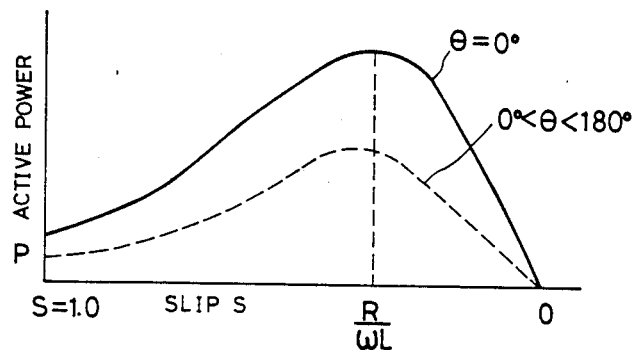
FIG. 5 is a graph showing the relation between the slip and the active power.

The graph in FIG. 5 shows the relation between the slip S of the rotor 8 and the active power P of the rotor input when there are no resisting members r which short-circuit the conductive members 5 at the region of the non-magnetic cores 9. It is noted that when the phase difference $\theta$ between the magnetic fields generated by the stators 24, 25 is 0°, the active power P achieves its maximum and when the same is $0° < \theta < 180°$, the active power P becomes smaller. If the resistance and the impedance of the resisting members 5 are shown as R and L and the angular frequency of the power source is made $\omega$, the maximum of the active power P appears when the slip is $S = (R/\omega L)$.

There is a proportional relationship between the active power P and the driving torque of the induction motor. Thus, by operating the pulse motor 35 and by rotating the first stator 24 and the second stator 25 which constitute the phase shifting means 38, it is possible to regulate the voltage induced in the conducting members 5 and smoothly control the speed of the rotor 8.

Figure 6:
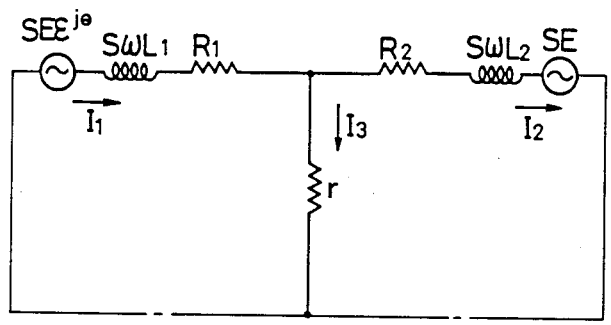
FIG. 6 shows an electric equivalent circuit of the rotor.

When the respective resistances of the conductive members 5 of the rotor 8 from the short-circuit rings 6, 7 to the connecting members r are made $R_1$, $R_2$, the inductances are $L_1$, $L_2$, the angular frequency is made $\omega$, and the resistances of the resisting members which short-circuit respective conductive members 5 are made r, the electric equivalent circuit of the rotor 8 will be as shown in FIG. 6. The symbols $I_1$, $I_2$, $I_3$ represent respective currents which flow through the branch passages concerned.

Figure 8:
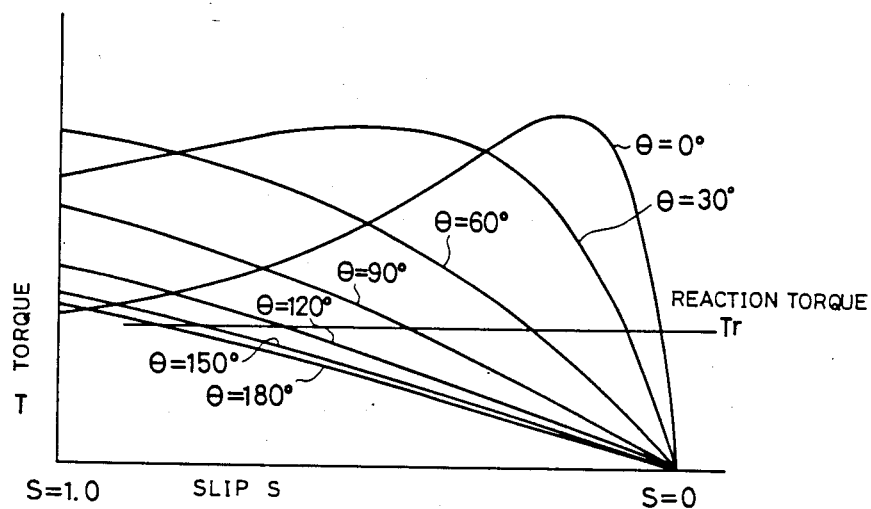
FIG. 8 is a graph showing the relation between the slip and the torque where a plurality of conductive members are respectively short-circuited by the connecting members and the stator windings are connected in series.

When the equivalent circuit as shown in FIG. 6 is converted into an equivalent circuit as seen from the side of the two stators 24, 25, such an equivalent circuit will be as shown in FIG. 8. When $R_1 = R_2$, $L_1 = L_2$ and the phase difference $\theta = 0°$, the current $I_3 (= I_1 - I_2)$ which flow through the resisting member r becomes 0. That is, no current flows to the resisting member r. This means that when $\theta = 0°$, the torque T is at the same value as that when the resisting members r are not present. Therefore, when $\theta=0°$, the torque characteristics of the motor will be the same as those of a conventional induction motor.

Next, when $R_1=R_2$, $L_1=L_2$ and the phase difference $\theta=180°$, the current $I_3(=I_1-I_2)$ which flows through the resisting members r becomes $2I_2$. Thus, when the resistor of the rotor conducting members in a conventional induction motor is made $R_1=R_2=R$, R becomes same as having increased to $R+2r$.

As the rotor 8 rotates, the cooling fans 19, 20 suck in air inside the machine frame 14 through the air passage holes 40 provided in the bearing bases 15, 16 and the air directly cools the first and the second stators 24, 25 and their windings 22, 23. The rotor cores 2, 3, the conductive members 5, the resisting members r, etc. are also cooled by the air passing through the air passage holes 13 through the air passage 12. This cooling ensures the stable functioning of the respective components of the motor.

The first and the second stators 24, 25 are rotated clockwise or counterclockwise by the switching of the pulse motor 35 but this is not limited to the use of the pulse motor 35 as the same result can be achieved by other driving means such as a reversible motor, a servo mechanism utilizing pneumatic or hydraulic cylinders, or it may be possible to operate by the use of manual handles. In the case of the embodiments illustrated herein, both the first stator 24 and the second stator 25 are rotatable, but this may well be arranged so that only one of them may rotate. Mechanisms for effecting the releasing and locking of the stators concerned may be those which are conventionally available.

Now the function of the arrangement wherein the windings 22, 23 wound on the first and the second stators 24, 25 are connected in series will be explained.

Since the stator windings 22, 23 are connected in series, when the current is fed to the windings 22 from a three-phase commercial power source, the currents which flow in the windings 22 and the windings 23 respectively are the same and unaffected even if there should be any differences in the respective resistances of the windings 22, 23 or in the volume of the two stators 24, 25. Therefore, the amount of currents which are induced in the conductive members 5 of the rotors 8 by the first stator 24 and that by the second stator 25 is the same and constant. This function plus the function that the amounts of the currents which are induced to flow in the conductive members 5 of the rotor 8 by the first stator 24 and the second stator 25, respectively, become the same correspondingly to the rotational differences between the first stator 24 and the second stator 25 which constitutes the phase shifting means 38, that is, the phase displacement generated in the flux of the rotating magnetic fields and also the function that the current in the amount of vector difference due to the difference in phases between the two stators 24, 25 flows through the resisting members connecting or short-circuiting the conductive members 5 altogether produce synergistic effects so that, as shown by torque characteristics in FIG. 8, it has been made possible to improve efficiency and to generate high driving torque in resepective speed ranges. Therefore, even when the motor is kept loaded it is possible to make an easy start at any given speed range and to make a smooth start or a high torque start in accordance with the starting characteristics required for a given load and, thus, the motor can be used for many different kinds of work and is suited for work requiring a repetition of frequent starts and stops. As explained above, the changing of to rotational speed of the rotor 8 is effected simply by the control of the phase displacement and by the control of the increase and decrease of the currents flowing in the conductive members 5 of the rotor 8, which is done by means of the phase shifting means 38.

The ratio between the amount of the currents that flow in the conductive members 5 of the rotor 8 respectively by the first stator 24 and the second stator 25 in which the windings 22, 23 are connected in series and the amount of the currents that flow through the resisting members r provided between the conductive members 5 is unrelated to the resistance value of the respective resisting member r and the slip value but is determined by the value of $P \times \theta$ (P is the pair number of poles and $\theta$ is the phase angle). This ratio becomes zero when $P\theta=\pi$ and becomes maximum when $P\theta=0$. When $P\theta$ is constant, the slip and torque characteristics become the same as those obtained in the state when a secondary resistor is inserted in an ordinary induction motor of a wound type so that, when $P\theta$ becomes smaller, the ratio of the currents flowing in the conductive members 5 of the rotor 8 also becomes smaller and this means that to make $P\theta$ smaller is same as to make smaller the secondary resistor in an ordinary induction motor of a wound type. When a rated current flows in both the stators 24, 25, even if the phase angle $\theta$ is optionally changed or shifted, it is possible to obtain substantially the same rated current and rated torque characteristics at respective low speed ranges as those obtained at the highest speed depending on the selection of the slip values and also the design associated with the resistance values of the resisting or connecting members. Even when the windings 22, 23 of the first and second stators 24, 25 are connected in series but there are no resistive or connecting members between the conductive members, substantially no voltage is induced in the rotor conductive members 5 of the rotor by one of the stators and, thus, such an arrangement is less efficient and provides lower torque as compared with one in which the windings 22, 23 of the stators 24, 25 are respectively connected to the power source in parallel.

Figure 9:
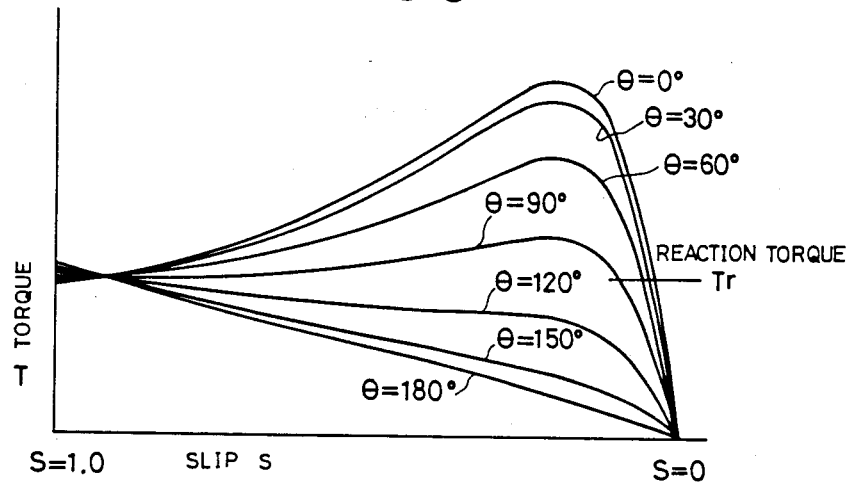
FIG. 9 is a graph showing the relation between the slip and the torque where the respective stator windings are connected in parallel to the power source lines.

On the contrary, when the windings 22, 23 of the first stator 24 and the second stator 25 are respectively connected to a three-phase commercial power source in parallel, as the voltages applied to the windings 22, 23 of the first stator 24 and the second stator 25 are the same, the voltages induced in the conductive members 5 of the rotors 8 by the two stators 24, 25 are the same but the phase of such voltages are different by $P\theta$. The currents flowing through the resisting members 5 are substantially in proportion to $(\frac{1}{2}) \times$(differential voltages between the voltages induced in the rotor conductive members 5 by the first and the second stators 24, 25 respectively)÷(resistance values of the resisting member r). However, in the conductive members 5 of the rotor 8, the current substantially proportional to (added voltages induced in the rotor conductive members by the first and the second stators)÷(impedance of the rotor conductive members) also flows in addition to the current which flows in the resisting members r. The added voltages become zero at $P\theta=\pi$ and reach a maximum at $P\theta=0$, and the impedance of the rotor conductive members varies depending on the slip as it consists of a resistance and secondary leakage reactance. Thus, the ratio of the currents which flow via the resisting members r disposed between the respective conductive members 5 against the amount of the currents which flow in the conductive members 5 of the rotor 8 varies depending on the slip and also the resistance values even when $P\theta$ is constant. The slip and torque characteristics under the constant $P\theta$ result in such characteristics as being a combination of the those under the state wherein a secondarily inserted resistor for an ordinary induction motor of a wound type is constant and those under the state wherein a primary voltage for an ordinary induction motor is controlled, which are as shown in FIG. 9. These characteristics show that the range in which the speed may be controlled is more limited as compared with that in an arrangement wherein the windings 22, 23 of the first and the second stators 24, 25 are connected in series.

Figure 10:
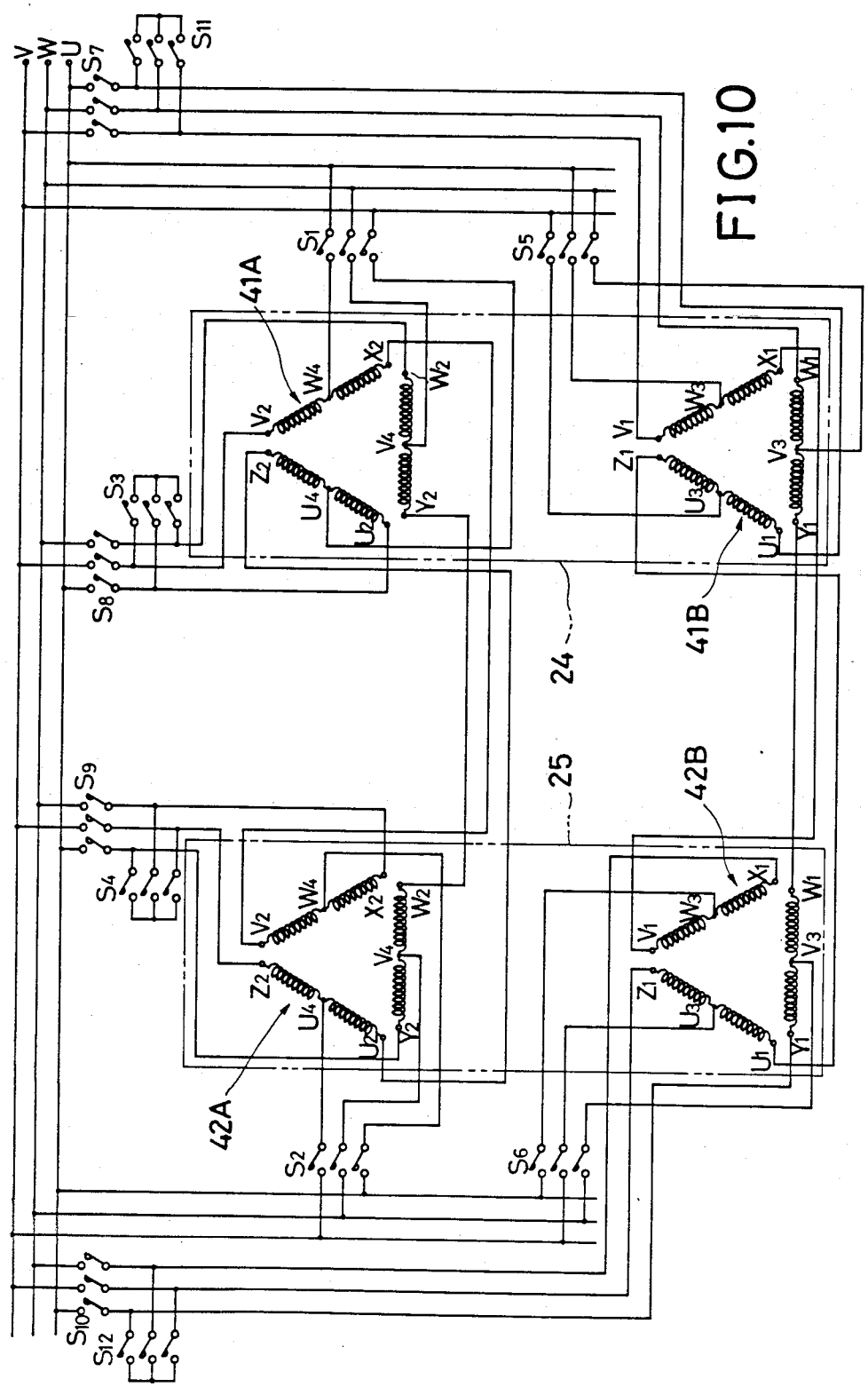
FIG. 10 is a wiring diagram where a plurality of windings are wound on the respective stators and the number of poles can be selected by the switches.

Next, by referring to FIG. 10, the ways wherein a plurality of windings provided on the first and second stators 24, 25 are connected so as to form a number of poles of different kinds will be explained.

The first stator 24 is wound with double windings 41A, 41B and the second stator 25 is wound with double windings 42A, 42B with terminals U2, V2, W2 and terminals U4, V4, W4 being provided respectively to the windings 41A, 42A as four pole terminals and eight pole terminals and with terminals U1, V1, W1 and terminals U3, V3, W3 being provided respectively to the windings 41B, 42B as six pole terminals and twelve pole terminals. The windings 41A of the first stator 24 and the windings 42A of the second stator 25 are connected in series. In the same manner, the windings 41B of the first stator 24 and the windings 42B of the second stator 25 are connected in series. To be more specific, the terminals U4, V4, W4 of the windings 41A of the first stator 24 are connected through a pole switch S1 and the terminals U3, V3, W3 of the windings 41B of the same stator are connected through a pole switch S5 to a three-phase commercial power source. The terminals U2, V2, W2 of the windings 41A are connected through pole switches S3, S8 and the terminals U1, V1, W1 of the windings 41B are connected through pole switches S7, S11 to the three-phase commercial power source.

Terminals X2, Y2, Z2 of the first stator 24 are connected to terminals V2, W2, U2 of the windings 42A of the second stator 25, and terminals X1, Y1, Z1 of the windings 41B of the first stator 24 are connected respectively to terminals V1, W1, U1 of the windings 42B of the second stator 25. Terminals X2, Y2, Z2 of the windings 42A of the second stator 25 are connected through pole switches S4, terminals U4, V4, W4 of the windings 42A are connected through a pole switch S2 respectively to the three-phase commercial power source. Terminals X1, Y1, Z1 of the windings 42B of the second stator 25 are connected through pole switches S10, S12 and terminals U3, V3, W3 of the same windings 42B are connected through a pole switch S6 to the three-phase commercial power source. Since the structure other than the connections of the windings 41A, 41B and the windings 42A, 42B of the first and second stators 24, 25 and the pole switches S1–S12 is the same as that shown in FIGS. 1–3, the same explanation is not repeated here.

The manner in which the above described arrangements functions is explained with reference to FIGS. 1–3 and FIG. 10.

Since the windings 41A would on the first stator 24 and the windings 42A on the second stator 25 are of four poles and eight poles while the windings 41B would on the first stator 24 and the windings 42B on the second stator 25 are of six poles and twelve poles, the synchronous speeds at the respective poles are as shown in the following table.

Relation between Poles and Synchronous Speeds (rpm.)

| Frequency | Poles | | | |
| --- | --- | --- | --- | --- |
| | 4 | 6 | 8 | 12 |
| 50 Hz | 1500 | 1000 | 750 | 500 |
| 60 Hz | 1800 | 1200 | 900 | 600 |

In view of the above relation between the poles and the synchronous speeds, the explanation is now made taking an example of a 60 Hz district and a speed of rotation of the rotary shaft 4 being 1100 rpm. The pole switches S5, S6, S11, S12 are switched-on while other remaining switches are in an off-state and power is supplied from the three-phase commercial power source to the windings 41B, 42B of the first and second stators 24, 25. Then, the rotor shaft or axis 4 will rotate at a synchronous speed of 1200 rpm. at the number of six poles due to the voltage induced in the conductive members 5 of the rotor 8 by the stators 24, 25. At this point, if the rotating speed is to be lowered by 100 rpm. to 1100 rpm., the pulse motor 35 is actuated so that the first stator 24 and the second stator 25 may rotate in an opposite direction with each other and the phase displacement thus created between the stators 24, 25 may be adjusted so that the rotational speed of the rotor shaft 4 is to be the desired value, that is, 1100 rpm. If the desired rotational speed of the rotor shaft 4 is 400 rpm., the pole switches S7, S10 are switched-on while the other switches remain in an off-state and this provides the synchronous speed of 600 rpm. at the number of 12 poles. A necessary speed control of a small range, namely, a range of 200 rpm. from 600 rpm. to 400 rpm., may be effected through the rotation of the first and the second stators 24, 25 by the pulse motor 35.

Let us assume that the desired rotation speed of the rotor shaft 4 is 800 rpm. In this instance, when the pole switches S8, S9 are switched on leaving the other switches off, the synchronous rotational speed at the number of eight poles becomes 900 rpm. and a further adjustment to 800 rpm. may be made by the control of the phase displacement which is effected by the rotation of the stators 24, 25 through the operation of the pulse motor 35.

When the desired rotational speed of 1600 rpm. is required for the rotor shaft 4, the pole switches S1, S2, S3, S4 are switched-on, leaving the other switches off, and the rotational speed of the shaft 4 will be the synchronous speed of 1800 rpm. at the number of four poles, and the pulse motor 35 may be put in operation to rotate the stators 24, 25 to adjust the phase displacement for the speed of 1600 rpm.

Figure 11:
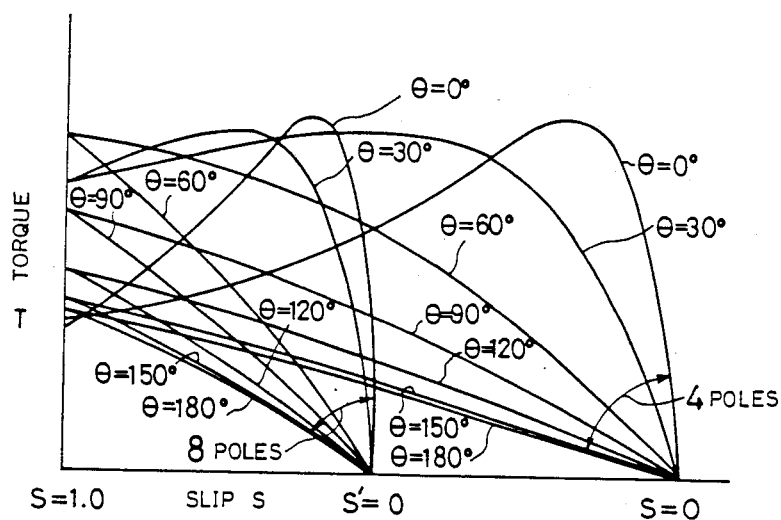
FIG. 11 is a graph showing the relation between the slip and the torque where the numbers of poles of the stators are four and eight.

In the control of the rotational speed as explained above, the pole switches S1–S12 are appropriately actuated so that the speed may momentarily changed to a point in the vicinity of the desired speed of rotation and then the rotation of the stators 24, 25 in a small amount may be adjusted to arrive finally at the desired speed of rotation. In this way, it is possible to achieve a speedy and stepless adjustment over a wide range of speeds and such control can be effected efficiently since the adjustment necessary may be effected in a vicinity of the respective synchronous speeds. This may be understood from the graph of FIG. 11 showing the relation between the slip and torque with four poles and eight poles. The arrangement just explained is coupled with the arrangement wherein the windings wound respectively on the two stators 24, 25 are connected in series and with the arrangement wherein the rotor conductive members 5 are short-circuited by the connecting members r, and due to the synergistic effects of these arrangements it has been made possible to improve the motor of which the rotational speed may be efficiently controlled in a wide range of speeds and which is capable of generating a large torque and adapted to be used as a motor of which is required frequent starting, stopping and changing of the rotational speed and of which is also required a wide range of speed control.

It is of course to be understood that the number of poles of the windings on the stators 24, 25 may be optionally selected according to the desired range of the speed control. Further, it may be possible to effect the control of speed in even a wide range if, for example, there are four stators on which a plurality of windings are provided and the current is applied to the particular windings which offer a synchronous speed near to the desired rotational speed by the operation of pole switches and also by the controlling of the phase displacement by means of the phase shifting means. This wide range control is achieved by the changing of the number of poles plus a small adjustment in the phase shifting means 38 constituted by the stators 24, 25. Since this adjustment just mentioned is small in the amount of rotation of the stators 24, 25, it is not required that both the stators to rotate as the rotation of either one of the stators is sufficient for the purpose.

Figure 12:
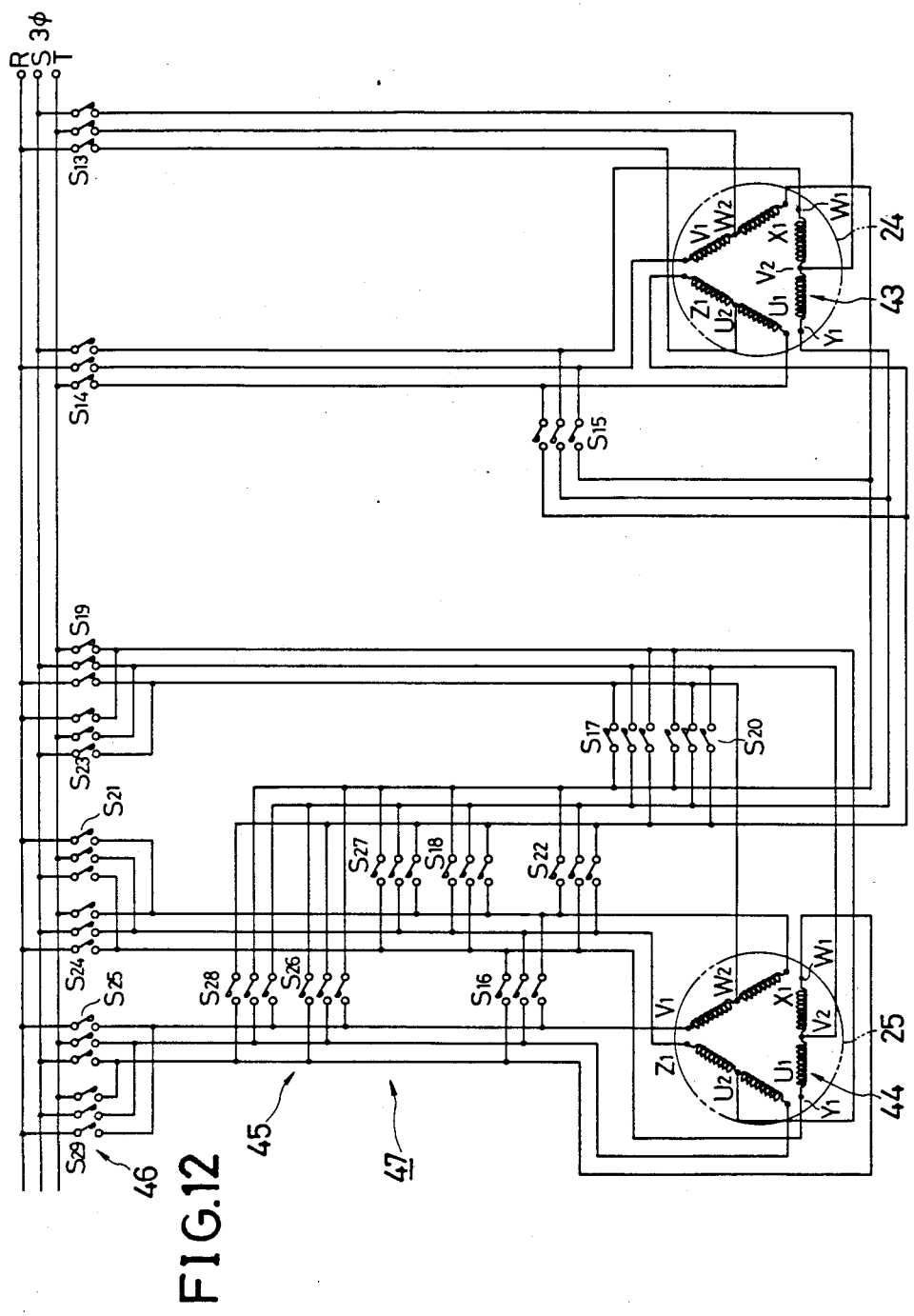
FIG. 12 is a wiring diagram showing the connection of the phase changing switches constituting the phase shifting means to the stator windings.

Next, making reference to FIG. 12, explanation is made of another phase shifting means in which phase changing switches are connected to the windings of the stators.

Single windings 43, 44 are provided on the first and second stators 24, 25 and terminals are provided respectively thereto for effecting the changing of the poles. Specifically, terminals U1, V1, W1 and U2, V2, W2 are provided respectively on the windings 43, 44 of the first and second stators 24, 25. The terminals U2, V2, W2 of the windings 43 are connected through a pole changing switch S13 and the terminals U1, V1, W1 of the same windings 43 are connected to a three-phase commercial power source. The terminals U1 and Z1, terminals V1 and X1, the terminals W1 and Y1 are connected respectively through a phase changing switch S15. In a connection passage 45 connecting the windings 43 and the windings 44 in series and a connection passage 46 making the connection between the windings 44 and the three-phase commercial power source, there are interposed a plurality of phase changing means which constitutes the phase shifting means 47.

The circuit of the windings 43 connected to the phase changing switch S15 is connected through a phase changing switch S17 to the terminals U2, V2, W2 of the windings 44 and, the terminals U1 and Z1, the terminals V1 and X1, and the terminals W1 and Y1 of the windings 44 are connected respectively through a phase changing switch S16, with the circuits of these respective terminals being connected to the three-phase commercial power source through a phase changing switch S25. In this way, the windings 43 and the windings 44 are connected in series and also in the same phase.

Further, in the connecting passage 45 in which the windings 43 and the windings 44 are connected in series and the connecting passage 46 in which the respective terminals of the windings 44 are connected to the three-phase commercial power source, there are respectively interposed phase changing switches S18–S24 and S26–S29. The details of the connection between the switches and the respective terminals of the windings 44 will be explained later in connection with the related explanation of the functions thereof. This embodiment is different from that shown in FIGS. 1 and 2 only in the structure in which the first and second stators are fixed to the machine frame 14 as they do not need to be rotated and the structure in which there are provided pole changing switches S13, S14 and phase changing switches S15–S29. Therefore, th explanation concerninng the same or similar arrangements is not repeated. In this embodiment, the phase changing switches S15–S29 constitute the phase shifting means 47.

The functions of the above described embodiment are now explained with reference to FIGS. 1, 2 and 12.

When the motor is operated at its maximum speed of rotation, the pole changing switch 13 and the phase changing switches S15, S16, S17, S25 are switched-on while the other switches are opened. This causes the windings 43, 44 to be in the same phase and in a series connection and the torque characteristics then are the same as those in an ordinary induction motor. Next, in the state in which the pole changing switch remains switched-on, the phase changing switches S15, S16, S19 S22 may be switched on, leaving the other switches opened. Then, the respective terminals of the windings 43 connected to the phase changing switchS15 and the circuits of the respective terminals of the windings 44 connected to the phase changing switch S16 are communicated to the phase changing switch S22 and the current flows from the terminals U2, V2, W2 of the windings 44 to the three-phase commercial power source through the phase changing switch S19. The phase displacement of the phase of the voltage applied to the windings 44 is 60° against the phase of the voltage applied to the windings 43 and the rotational speed of the rotor 8 is lowered proportionately to this phase displacement of 60°.

When the phase changing switches S15, S16, S20, S24 are switched-on while the pole changing switch S13 remains switched-on, the phase displacement of the voltage applied to the windings 44 becomes 120° against the phase of the voltage applied to the windings 43 and the rotational speed of the rotor 8 becomes lower than that when the phase displacement was 60°. In order to make the rotational speed further lower, the phase changing switches S15, S16, S22, S23 may be switched-on leaving all the other switches opened while the pole changing switch S13 remains switched-on and, when this has taken place, the phase displacement of the voltage applied to the windings 44 becomes 180° against the phase of the voltage applied to the windings 43 and, under the condition with the same pole, the rotational speed becomes the lowest. In this state, since the torque becomes lower, it may be effective if the rotational speed is controlled after the switching of poles to those of a larger number than those provided to the windings 43, 44. The manner of such operation is explained hereinafter.

First, when the pole changing switch S14 at the side of the stator windings 43 and the phase changing switches S21, S26 are switched-on while the other switches are opened, the windings 43 and the winding 44 are connected in series through the connecting passage 45, so that the current communicates between the windings 43 and the windings 44 through the phase changing switch S26 and flows to the three-phase commercial power source through the phases changing switch S21 and, under this state, the phase of the voltage applied to the windings 43 and that applied to the windings 44 are the same and the speed of rotation is the highest. Next, when the phase changing switches S25, S27 are switched-on, leaving the other switches opened while the pole changing switch S14 remains switched-on, the terminals X1, Y1, Z1 of the windings 43 communicate with the terminals Y, Z, X of the windings 44 and the current flows from the terminals U1, V1, W1 of the windings 44 to the three-phase commercial power source through the phase changing switch S25. The phase displacement of the voltages respectively applied to the windings 43, 44 is 60°, and therefore the rotational speed here is lower proportionately to this phase displacement than in the situation where there is no phase displacement.

When, under the state in which the pole changing switch S14 remains switched-on, the phase changing switches S24, S28 are switched-on leaving the other switches opened, the phase displacement between the windings 43, 44 becomes 120°, at which the rotational speed is lower than that at the phase displacement of 60°. In order to make the rotational speed lowest, while the pole switch S14 is kept switched-on, the phase changing switches S22, S29 may be switched-on while the other switches are opened so that the phase displacement of the voltages applied respectively to the windings 43, 44 becomes 180° and this results in the lowest speed of rotation.

As explained above, by the appropriate operation of the phase changing switches S15-S29 constituting the phase shifting means 47 and also the pole switches S13, S14, it is possible to control the phases of the voltages applied to a plurality of the stators so that the overall control of the rotational speed can be made efficiently.

The significance of the embodiment in the structure in which the phase shifting means 47 employs the phase changing means resides in that, although the control of the speed cannot be effected gradually or continuously, it is possible to achieve speedy control of the rotational speed by switching the number of poles and the phases of voltages. If, in this embodiment, an arrangement is made whereby both or either of the first and second stators 24, 25 are rotated so that the phase may auxiliarily be controlled, it may be possible to effect the changing of rotational speed in a continuous form and in a quick fashion. The changing of speed to any desired speed can also be performed by the attachment of the voltage adjusting means to the phase shifting means 47.

Figure 13:
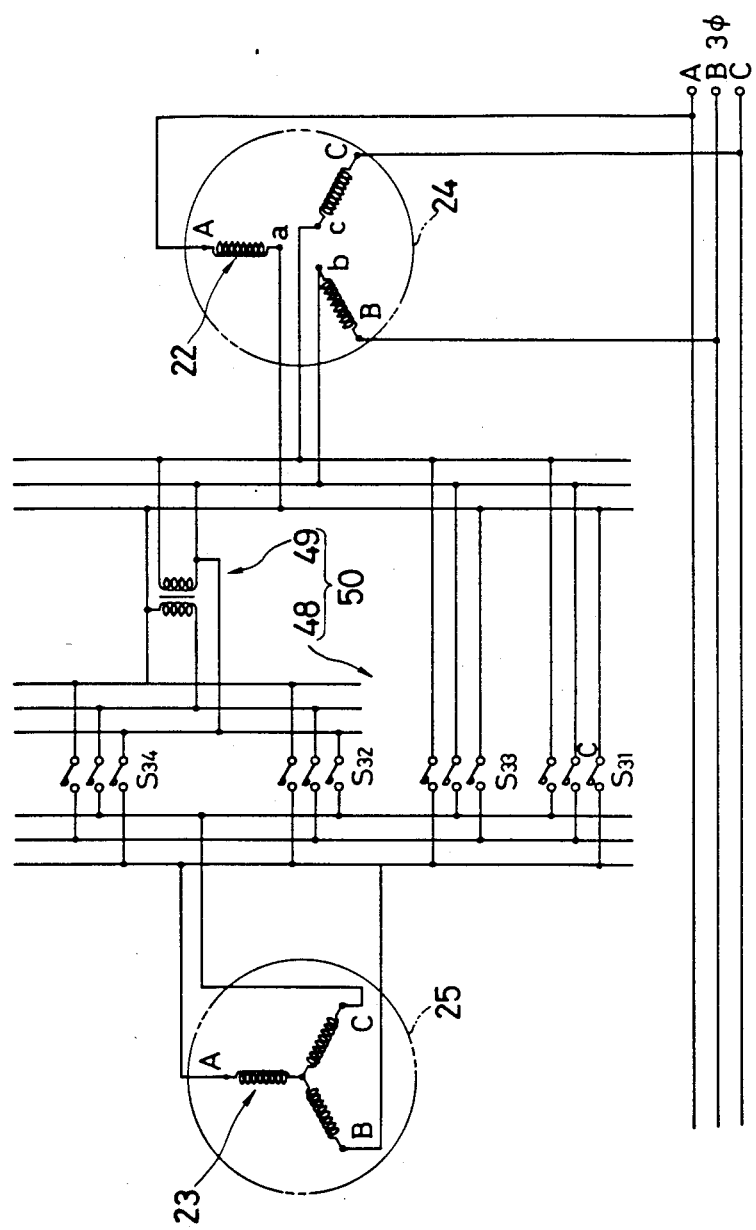
FIG. 13 is a schematic illustration where the phase shifting means is constituted by a combination of a single-phase transformer and a plurality of phase changing switches.

Next, FIG. 13 is referred to for the explanation of still another embodiment of the phase shifting means.

Terminals A, B, C of the windings 22 of the first stator 24 are connected to three-phase commercial power source and terminals a, b, c of the windings 22 are connected to the terminals A, B, C of the windings 23 of the second stator 25 through the phase shifting means 50 which is constituted by a single-phase transformer 49 and a connection switching means 48. To be more specific, the terminals a, b, c of the windings 22 are connected to the primary winding of the transformer 49 and also to the connection changing switches S31, S33 while the secondary windings of the transformer 49 are connected to the connection changing switches S32, S34 as shown in the drawings. The terminals A, B, C of the windings 23 of the second stator 25 are respectively connected to the connection changing switches S31-S34.

The functions of the above described embodiment are now explained. The terminals A, B, C of the windings 22 are connected to the three-phase commercial power source and a magnetic switch S31 only of the connection switching means S48 is switched-on and the other switches are opened, so that the phases of the voltages applied respectively to the windings 22, 23 are the same and the rotational speed of the rotor shaft 4 becomes the highest. Next, when the connection changing switch S32 only is switched-on and the other switches are opened, the phase of the voltage applied to the windings 23 through the transformer 49 is advanced by 60° against the phase of the voltage applied to the windings 22 so that the rotational speed becomes lower as compared with that when the phases of the voltages are the same. When the connection changing switch S33 alone is switched-on, the phase of the voltage applied to the windings 23 becomes that advanced by 120° against the phase of the voltage applied to the windings 22 with a result that the rotational speed is lower than when the phase displacement was 60°. When the connection changing switch S34 alone is switched-on, the phase of the voltage applied to the windings 23 is advanced by 180° as compared with the phase of the voltage applied to the windings 22, in which case the rotational speed is the lowest. The torque characteristics of this embodiment are also the same as those shown in FIG. 8. The phase displacement developed in the voltages between the first stator 24 and the second stator 25 by the connection changing varies stepwise but it is possible to control the speed to be at any desired speed if both or either of the first and second stators 24, 25 are made to be rotatable. In such a case, since it is possible to change speeds in a wide range by means of the connection changing switches and also by the rotation of the stators as auxiliary means, the amount of the required rotation of the stators may be limited to a small range and thus the speed control may be effected rapidly.

Figure 14:
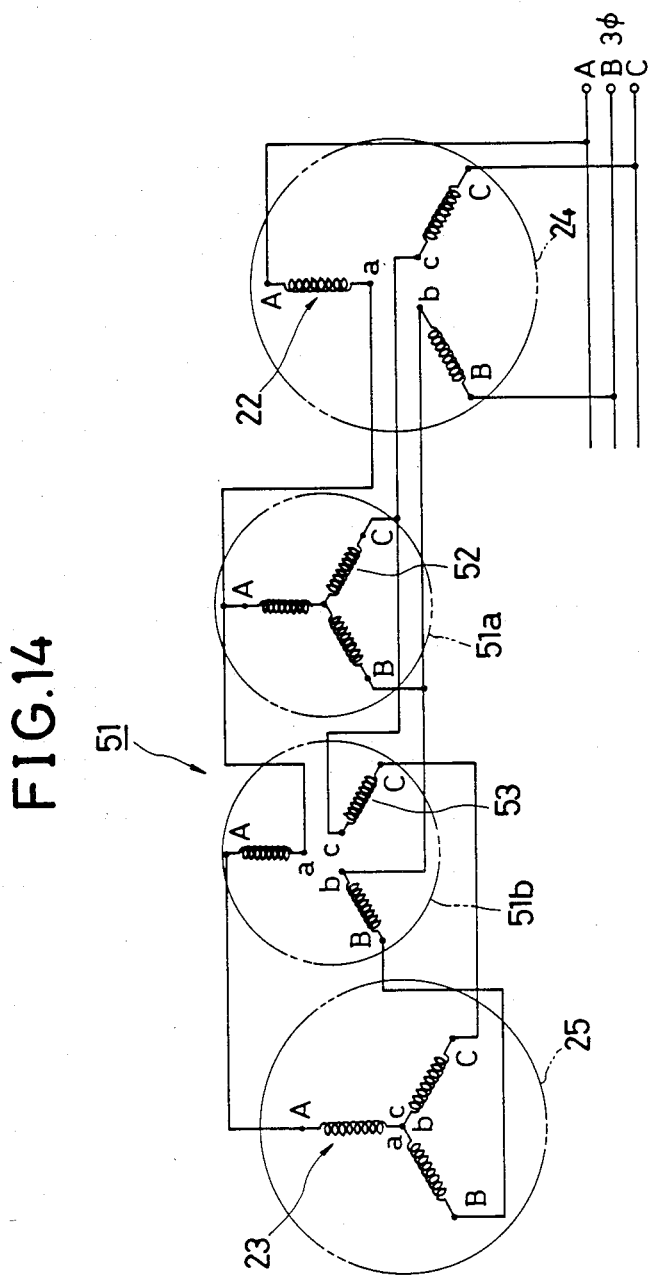
FIG. 14 is a schematic illustration where the phase shifting means is constituted by an induction voltage regulator.

Another example of the phase shifting means is hereinafter explained with reference to FIG. 14.

The phase shifting means of this example is a three-phase induction voltage regulator 51 which includes a stator 51a provided on the frame and a rotor 51b axially provided within the stator 51a and in which the stator 51a has primary windings 52 and the rotor 51b has secondary windings 53. Terminals A, B, C of the windings 22 of the first stator 24 are connected to a three-phase commercial power source. Terminals A, B, C of the primary windings 52 of the three-phase induction voltage regulator 51 are connected to terminals a, b, c of the windings 22 of the first stator 24 and also connected to terminals a, b, c of the secondary windings 53. The terminals A, B, C of the secondary windings 53 are connected to the terminals A, B, C of the windings 23 of the second stator 25. That is, the stator windings 22, 23 of the motor are connected in series through the three-phase induction voltage regulator 51 which serves as an intermediate phase shifting means.

In this embodiment, the rotor 51B having the secondary windings 53 is rotated in a desired amount of rotation and the phases of the voltages applied to the windings 22, 23 of the first and second stators 24, 25 are displaced so that the rotational speed can be controlled to a speed as required. Now, the ways in which the windings wound on the first and second stators 24, 25 are connected are explained with reference to FIG. 15.

Terminals U, V, W of the windings 22 wound on the first stator 24 are connected through a switch M1 and terminals X, Y, Z are connected through a switch M5 to the three-phase commercial power source. Terminals X, Y, Z of the windings 22 are able to be short-circuited with each other through a short-circuit switch M6. The terminals U, V, W and the terminals Z, X, Y of the windings 22 can be connected through a switch M2. On the other hand, the terminals U, V, W of the windings 23 are connected through a switch M9 and the terminals X, Y, Z are connected through a switch M3 to the three-phase commercial power source. The terminals U, V, W of the windings of the windings 23 can be short-circuited by a short-circuit switch M7. The terminals U, V, W and the terminals Z, X, Y of the windings 23 are able to be connected through a swithch M4. When the terminals U, V, W of the windings 22 and the terminals X, Y, Z of the windings 23 are connected through a switch M8 and the terminals X, Y, Z of the windings 22 and the terminals X, Y, Z of the windings 23 are connected through a switch M10, the windings 22 and the windings 23 can be interconnected in series.

Figure 15:
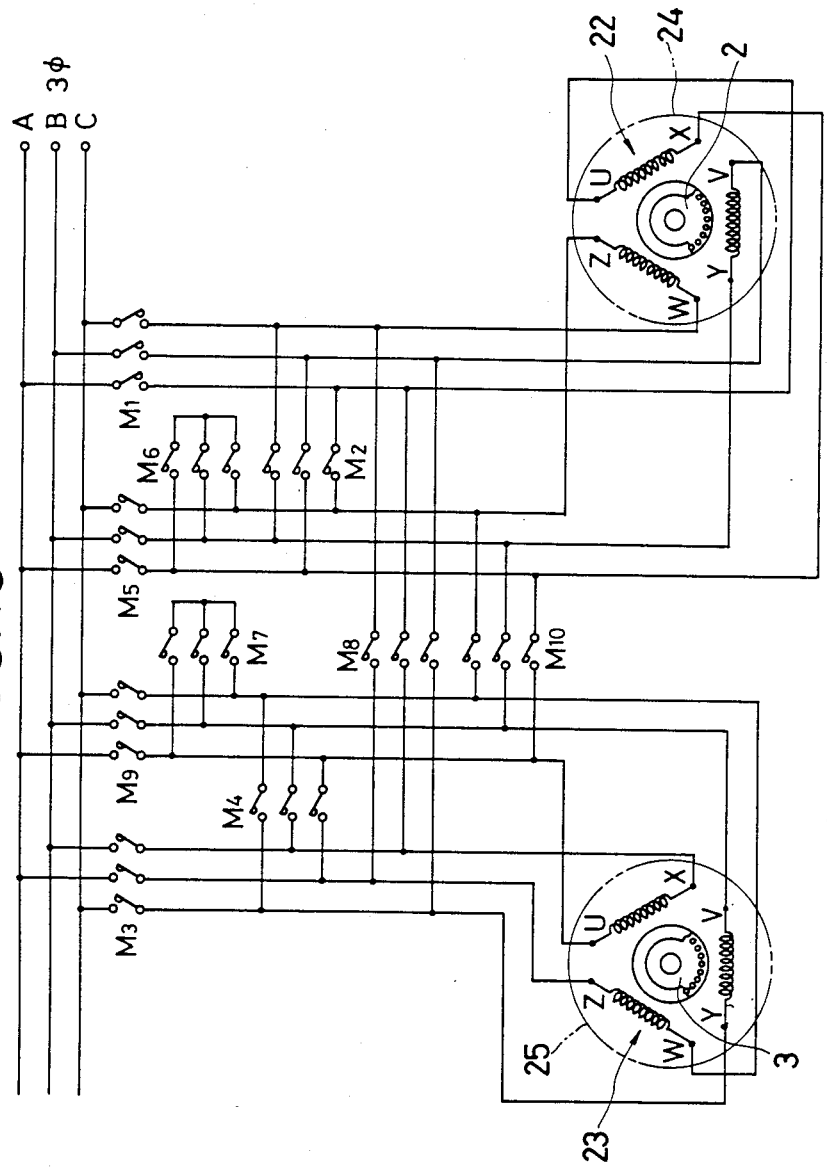
FIG. 15 is a wiring diagram where the connection of the stator windings are changed between a delta-connection and a star-connection by switches.

Functions of the above described embodiment are hereinafter explained with reference to FIGS. 1 and 15.

The windings 22, 23 of the first and second stators 24, 25 are connected in a delta-form when the switches M1, M3 as well as M10 are switched-on and the other switches are left opened. When the currents are supplied from the three-phase commercial power source to these windings 22, 23, the magnetic fields are generated around the stators 24, 25 and due to these magnetic fields the currents flow to the conductive members 5 of the rotor 8 so that the rotor 8 rotates. When the displacement of rotation angles between the first and second stators 24, 25 is zero, there develops no phase displacement between the magnetic fields generated by the stators 24, 25. Thus, the torque characteristics are the same as those in an ordinary induction motor and the rotational speed becomes the highest.

Figure 16:
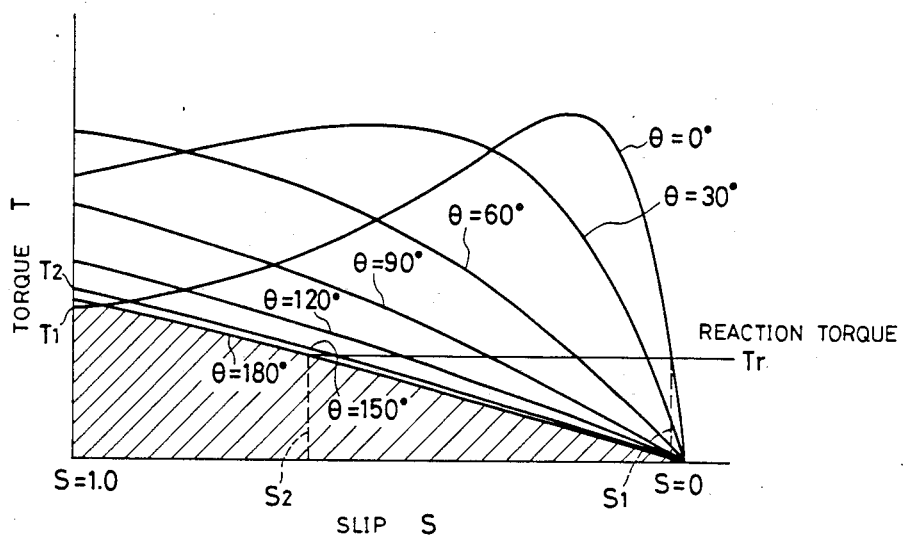
FIGS. 16 and 17 are graphs showing the relation between the slip and the torque.

When the pulse motor 35 is operated, the rotational speed may be continuously controlled by the rotation of the first and second stators 24, 25. When phase difference between the voltages applied to the two stators 24, 25 becomes 180°, the rotational speed reaches the lowest speed of rotation. The relation between the slip and the torque under the situation wherein the stator windings 22, 23 are in a delta-connection and the phase angles are from the zero to 180° are as shown in FIG. 16. In the slip range of S1 to S2, it is possible to control the rotational speed of the rotor shaft 4 to any desired speed.

However, under the above state, it is not possible to control the rotational speed in the slip range of S=S2 to S=1.0. That is, the area shown in hatch lines in FIG. 16 are in the range in which the speed control is not possible.

In order to cope with the above, the windings 22, 23 may be changed to a Y- or star-connection and this is effected when the switches M6, M8 as well as M9 are switched-on and the other switches are left opened. Under this state, the fluxes $\phi_1'$, $\phi_2'$ of the magnetic fields formed by the first stator 24 and the second stator 25 are of the same phase. However, since the windings 22, 23 of the first and second stators 24, 25 are respectively in Y-connection, the voltages applied to the windings 22, 23 are $1/\sqrt{3}$ of that applied in the case of the delta-connection explained above. This means that the voltages induced in the conductive members 5 of the rotor 8 by the fluxes $\phi_1'$, $\phi_{b2}'$ are also $1/\sqrt{3}$ and the torque of the rotor 8 is proportional to the square of the voltage so that the torque becomes $\frac{1}{3}$.

Figure 17:
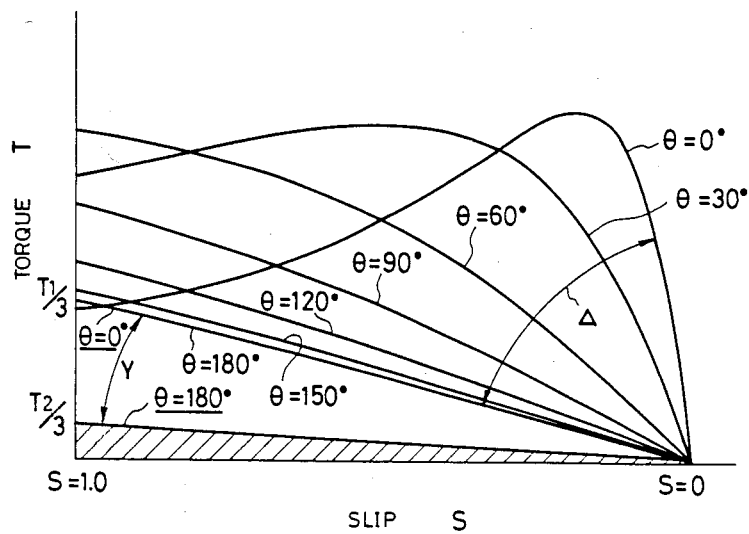

Therefore, in FIG. 16, based on the assumption that the torque under $\theta=0°$, S=1.0 is T1 and the torque under $\theta=180°$, S=1.0 is T2, when the connections of the windings 22, 23 of the first and second stators 24, 25 are switched to the Y-connection, the torque characteristics are, as shown in FIG. 17, such that the torque under $\theta=180°$, S=1.0 becomes $T_1/3$ and the torque under $\theta=0°$, S=1.0 becomes $T_2/3$ so that the area to be shown in hatch lines showing a range in which the speed control is not possible becomes smaller. The phases of the stators 24, 25 become the same if the design is made such that $T2=T1/3$, the connection of the windings of the first and second stators 24, 25 is switched to a delta-connection, the phase angle of the voltage induced in the conductive members 5 of the rotor 8 is changed from 0° to 180° by the rotation of the first and second stators 24, 25, and then the connection of the windings 22, 23 of the two stators 24, 25 is switched to a star-connection. Thus, if the first and second stators 24, 25 are rotated in the direction opposite to the above so as to change the phases of the voltages from 0° to 180°, it is possible to effect a wide range speed control in coping with large changes in the reaction torque from the load concerned and it is possible to maintain a large torque even in a low speed range.

Figure 18:
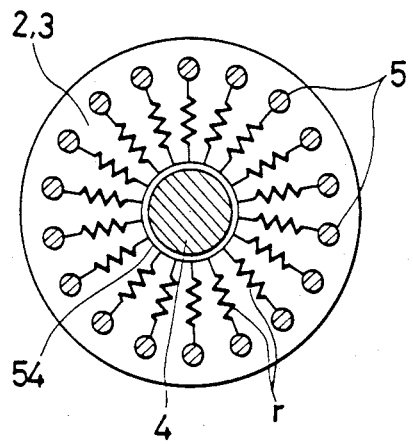
FIG. 18 is a partially sectional view of the rotor where resisting members are provided between a plurality of conductive members.

FIG. 18 shows an example in which, in the region of the air space between the rotor cores 2, 3 or at the position of the non-magnetic core 9, the conductive members 5 provided on the rotor cores 2 among themselves and these with the high resistance ring 54 extending over the rotary shaft 4 may be short-circuited by the connecting members of resisting member r. Even when the connecting members in resisting material r are not connected all of the conductive members (that is, some conductive members remain unconnected), a limited function is still obtained. There are situations in which, in order to improve the power and torque, a set of zener diodes connected in series and in a reverse pole fashion is used as the connecting members to be interposed between the conductive members 5, the resisting material and the set of zener diodes just mentioned connected in series are used as connecting members or such resisting members and such set of zener diodes is connected with these being disposed together in between the conductive members 5.

The above described phase shifting means for the present invention are not limited to those explained above since other means may optionally be used as long such means are capable of producing the phase displacement between the magnetic fields generated by the two stators. Also, the conductive members to be provided on the rotor cores may be of a material of low resistance as the respective conductive members may be short-circuited by the connecting members and they can still contribute to the improvement of the torque characteristics and also the efficiency as explained above. If the windings on the stators are of the kind in which the changing of the number of poles is not possible, the windings provided respectively on a plurality of cores may be connected in series and connecting members as resisting members may be interposed in the passages concerned and in this way the same or similar effects may be obtained. As for the windings on the rotor cores, either the star-connection or the delta-connection may appropriately be selected.

Figure 19:
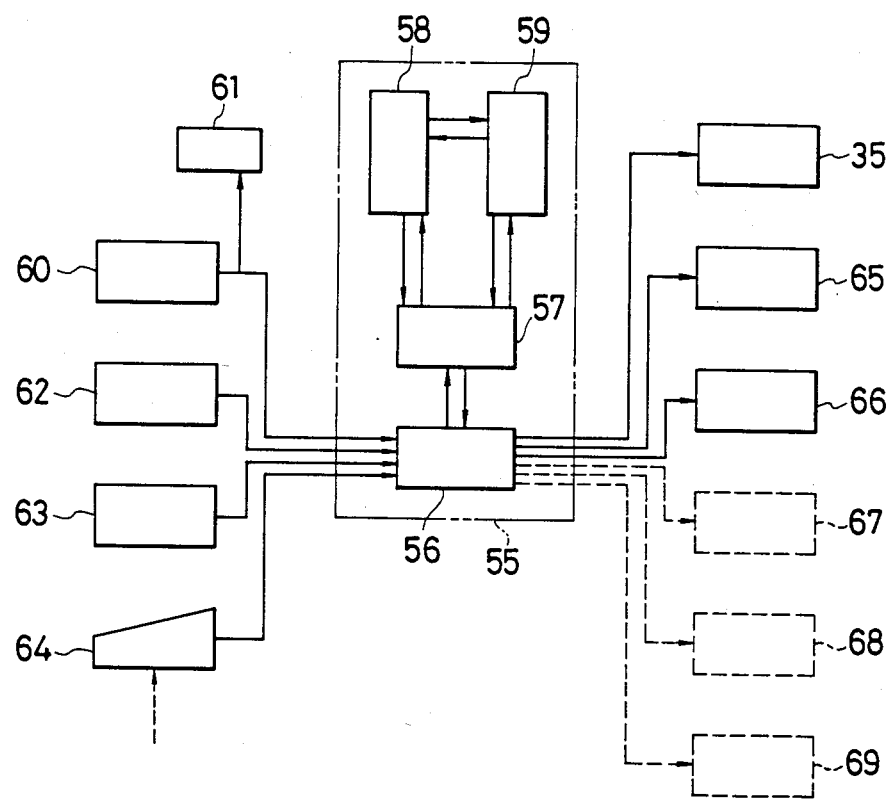
FIG. 19 is a block diagram illustrating the automatic control of the induction motor of the present invention.
Figure 1:
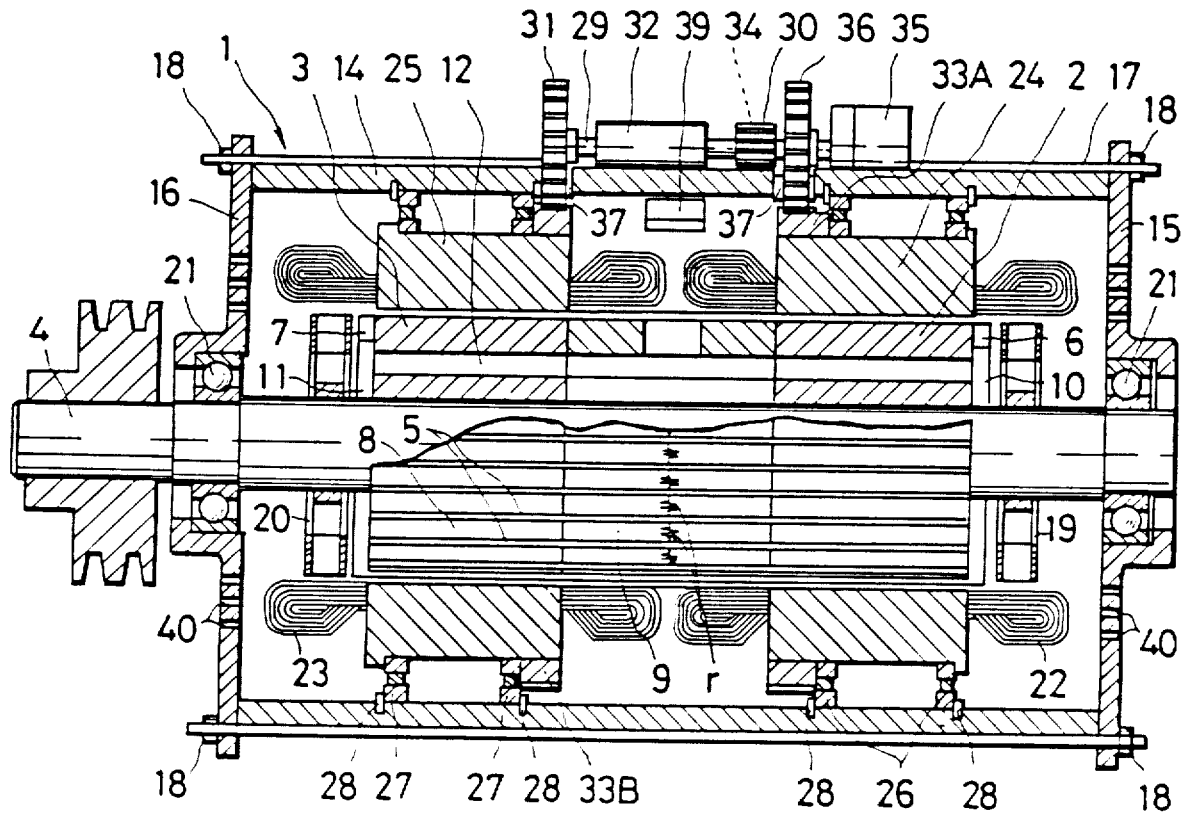
Figure 13:
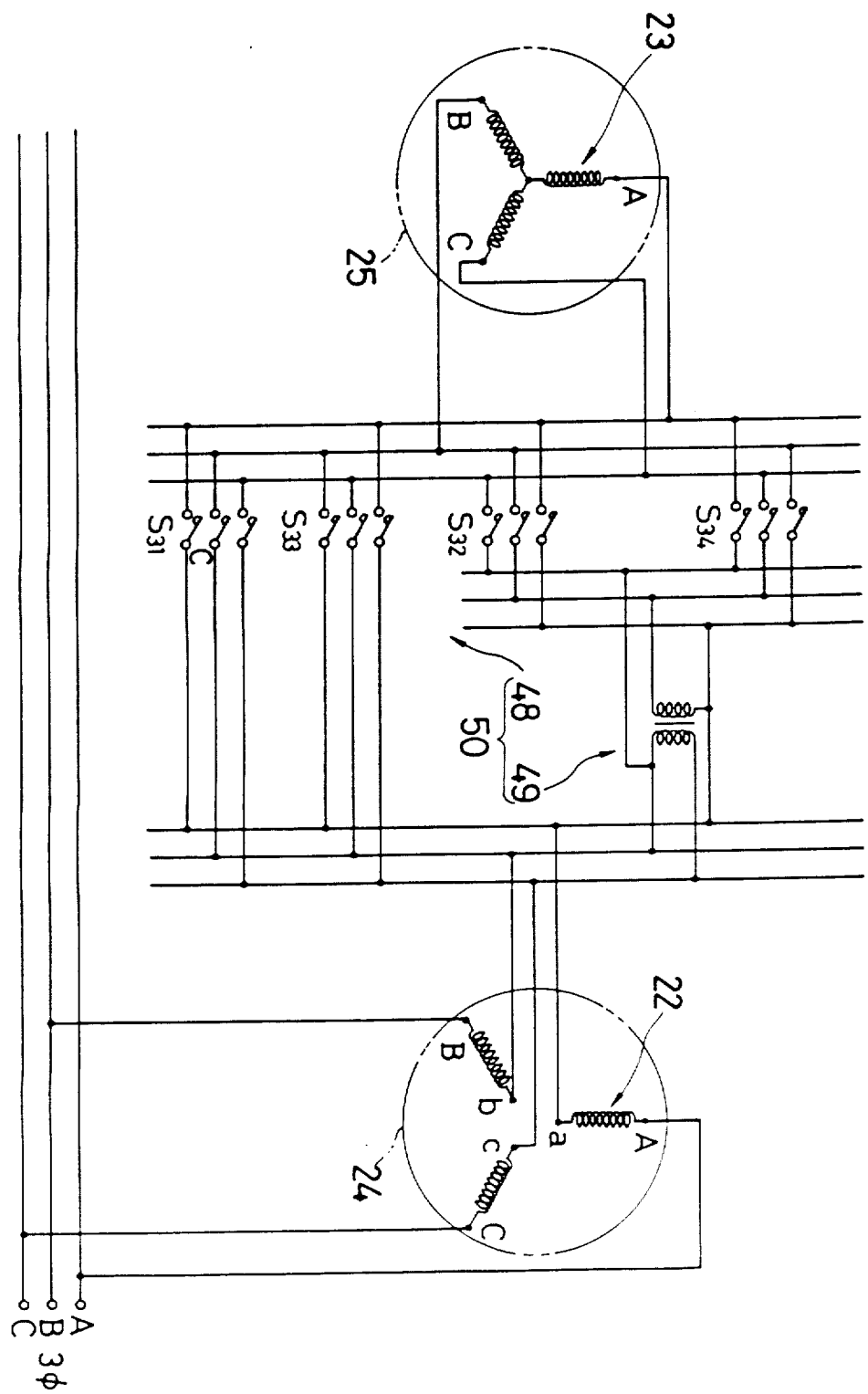
Figure 19:
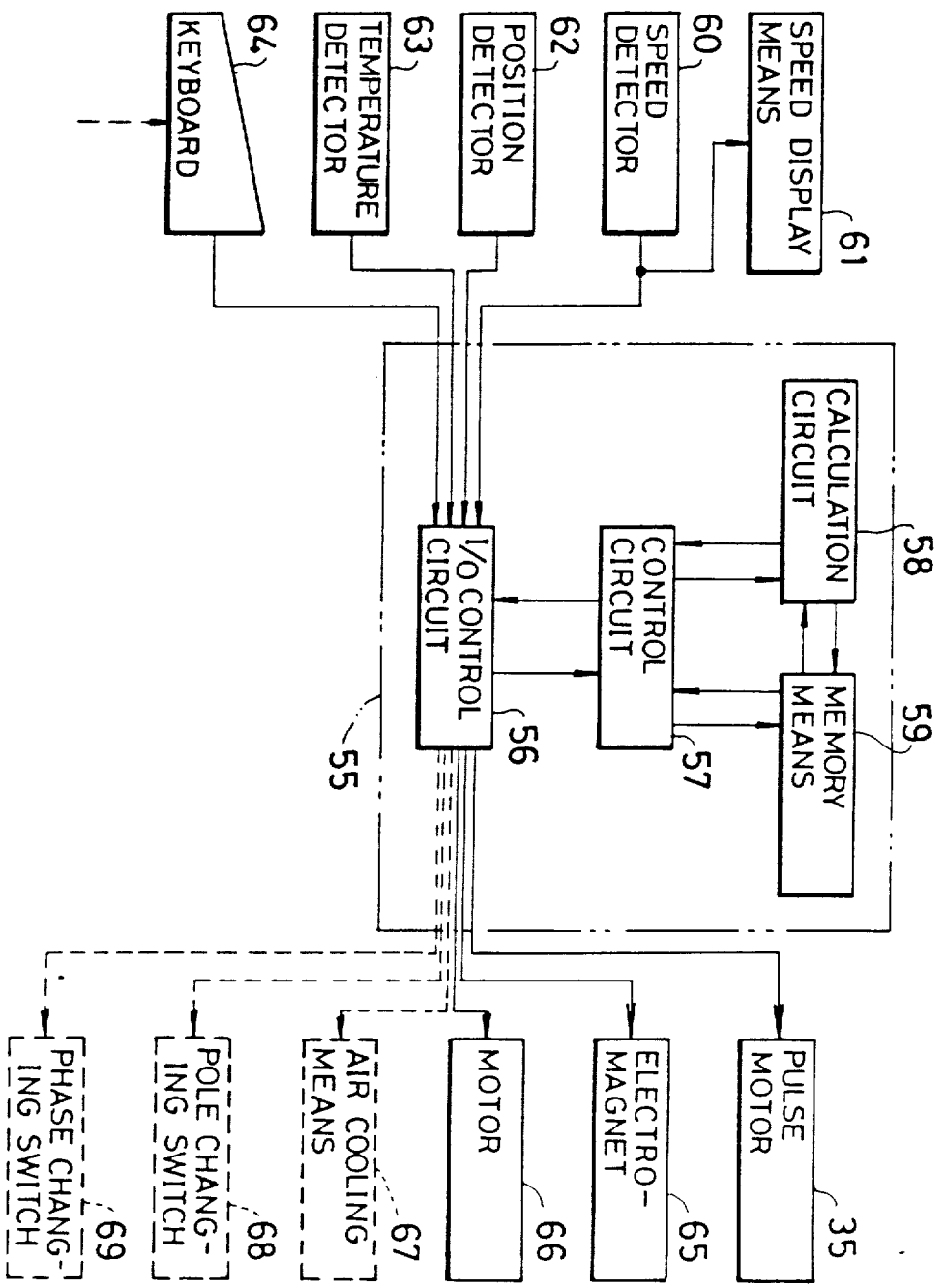

FIG. 19 which shows block diagrams is referred to for the explanation of an example in which a controllable speed induction motor is controlled.

To the input side of a control means 55 consisting of an input-output control circuit 56, a control circuit 57, a calculation circuit 58, a memory circuit 59, etc., there are connected a speed detector 60 in a form such as a tacho-generator having a speed display means 61, a stator rotation position detector 62 such as a magnetic sensor, temperature detectors 63 disposed at various portions within the machine frame 14 and a keyboard having a display means. To the output side of the control means 55, there are connected a pulse motor 35, an electromagnet 65 for locking and releasing the rotation of the rotatable stator and a motor 66 for driving fans to blow air in and out of the machine frame 14 for cooling the windings 22, 23, conductive members 5, resisting members r, etc. In the memory circuit 59 of the control means 55, certain control information is input in advance through the keyboard 64. That is, examples of such information are the values as to the amount of rotation of the rotatable stator with respect to the phase angle of 0°–180°, the pulse control values of the pulse motor 35 with respect to the amount of rotation of the stator, the relation of the position detector 62 for the stator with respect to the phase angles of 0°–180° and the values of temperature to start cooling inside the machine frame 14. When the rotational speed control values for the rotor shaft 4 are input to the control means 55 through the operation of the keyboard 64, the amount of the rotation that is required for the stator to meet the rotational speed values input is calculated and the pulse control values for the pulse motor 35 corresponding to the amount of rotation of the stator is calculated. The electromagnet 65 is operated based on the output signals from the control means 55, the lock mechanism of the stator is released and the phase motor 35 operates on receiving signals from the control means 55 for carrying out the speed control operation. The detected speed value coming from the speed detector 60 mounted on the rotary shaft 4 and the speed control value are compared and, when there is a discrepancy between them, the control means 55 outputs signals to the pulse motor 35 for compensating and controlling the rotational speed. When there is no discrepancy, it is understood that the rotational speed is at a desired speed and the rotation of the stator is locked by the electromagnet 65.

When the value of the temperature detected by the temperature detector 63 communicated to the control means 55 is higher than the reference value of the temperature set at the memory circuit 59, the motor 66 for the fans starts due to the signals output from the control means 55 to blow air to cool the windings 22, 23, the conductive members 5, the resisting members r, etc. When any new rotational speed value is input from the keyboard in the course of operation, the calculation is made as to the phase control value which is necessary to operate the pulse motor 35 for the desired rotational value with respect to the position at that time of the stator as communicated from the stator rotation position detector 62 and the electromagnet 65 and the pulse motor 35 resume their operation based on the output signals from the control means 55 whereby the rotational speed is controlled.

It is possible for the pole changing switch 68, the phase changing switch 69, etc. to be connected at the output side of the control means 55 in order to carry out automatic control, which corresponds to the speed control value input in the control means 55. It is also possible for the air cooling means 67 to be connected to the fans in order to operate the air cooling means 67 based on the temperature reference value provided to the control means 55.

The induction motor of the present invention may be used as an induction generator for generating electricity, in which case an expensive speed adjusting apparatus can be dispensed with if the rotor shaft is directly connected to the shaft of turbine or gas turbine. Where a combustion engine as a prime mover is connected, it is possible to generate electricity in accordance with the number of rotations at which the energy consumption is the minimum. Where the energy source is wind or water, the prime power is weak and unstable but it is possible to generate electricity at the rotational speed at which the maximum output can be drawn out. When a hydraulic energy source is used, the electric generation is efficiently carried out according to the speed of hydraulic flow and a complex and expensive variable pitch device or a rotary phase modifier can be dispensed with. Also, the synchronization with an outside power and can be done without the need of an expensive synchronizer. Further, if the rotary shaft is connected to other rotary shafts, a switch is provided to change two phases among three at the input side of the stator windings and the rotary shaft is made to rotate in either direction by a switch means, the system can be used as a brake means by use of the switch and the phase shifting means. By controlling the rotational speed through the phase shifting means, it is possible to regulate the braking action of a rotary means which is connected to the rotary shaft.

What is claimed is:

1. A variable speed controlled induction motor comprising:
    a rotor formed in one-piece having a plurality of rotor cores mounted, with a predetermined air space or a non-magnetic core portion being provided therebetween, on a common axis and having a plurality of conductive members interconnected and respectively mounted on said rotor cores;
    a plurality of stators having a plurality of stator cores disposed side by side and surroundingly facing said respective rotor cores and having stator windings wound respectively on said stator cores, said stator windings being connected or coupled in series with respect to a power source;
    connecting members short-circuiting said conductive members at said air space or non-magnetic core portion disposed between said rotor cores; and
    phase shifting means for producing phase differences between the voltages induced on the portions of said conductive members which face one of said plurality of stators and the voltages induced on the corresponding portions of said conductive members which face another one of said stators.

2. A variable speed controlled induction motor comprising:
    a rotor formed in one piece having a plurality of rotor cores mounted, with a predetermined space being provided therebetween, on a common axis and having a plurality of conductive members interconnected and respectively mounted on said rotor cores;
    a plurality of stators having a plurality of stator cores disposed side by side and surroundingly facing said respective rotor cores and having stator windings wound respectively on said stator cores, said stator windings being connected or coupled in series with respect to a power source;

connecting members short-circuiting said conductive members at an air space or a non-magnetic core portion disposed at said air space between said rotor cores; and phase shifting means for producing phase differences between the voltages induced on the portions of said conductive members which face one of said plurality of stators and the voltages induced on the corresponding portions of said conductive members which face another one of said stators, said phase shifting means being formed by a single-phase transformer and connection switches provided therebetween the respective stator windings of said plurality of stators.

3. A variable speed controlled induction motor comprising:

a rotor formed in one piece having a plurality of rotor cores mounted, with a predetermined space being provided therebetween, on a common axis and having a plurality of conductive members interconnected and respectively mounted on said rotor cores;

a plurality of stators having a plurality of stator cores disposed side by side and surroundingly facing said respective rotor cores and having stator windings wound respectively on said stator cores, said stator windings being connected or coupled in series with respect to a power source;

connecting members short-circuiting said conductive members at an air space or a non-magnetic core portion disposed at said space between said rotor cores; and phase shifting means for producing phase differences between the voltages induced on the portions of said conductive members which face one of said plurality of stators and the voltages induced on the corresponding portions of said conductive members which face another one of said stators, said phase shifting means being an induction voltage regulator provided between the respective stator windings of said plurality of stators.

4. A variable speed controlled induction motor comprising:

a rotor formed in one piece having a plurality of rotor cores mounted, with a predetermined space being provided therebetween, on a common axis and having a plurality of conductive members interconnected and respectively mounted on said rotor cores;

a plurality of stators having a plurality of stator cores disposed side by side and surroundingly facing said respective rotor cores and having stator windings wound respectively on said stator cores, said stator windings being connected or coupled in series with respect to a power source, said stators respectively having windings with a plurality of poles and said windings having terminals to which pole changing switches are connected, enabling the number of poles of the stators to be changed by the operation of said pole changing switches;

connecting members short-circuiting said conductive members at an air space or a non-magnetic core portion disposed at said space between said rotor cores; and phase shifting means for producing phase differences between the voltages induced on the portions of said conductive members which face one of said plurality of stators and the voltages induced on the corresponding portions of said conductive members which face another one of said stators.

5. A variable speed controlled induction motor according to claim 2, wherein said phase shifting means further comprises means for rotating at least one stator out of said plurality of stators with respect to the other stator on the axis common to that of said rotor, whereby the displacement of phase angles of the voltages induced on the respective portions of said conductive members facing to said plurality of stators can be continuously adjustable.

6. A variable speed controlled induction motor according to claim 4, wherein said phase shifting means comprises means for rotating at least one stator of said plurality of stators with respect to the other stator on the axis common to that of said rotor, whereby the displacement of phase angles of the voltages induced on the respective portions of said conductive members facing to said plurality stators can be freely adjustable within the range from 0°–180°.

7. A variable speed controlled induction motor according to claim 4, wherein said phase shifting means comprises means for rotating at least one stator out of said plurality of stators with respect to the other stator on the axis common to that of said rotor, and comprises a plurality of phase changing switches provided between the stator windings of at least one stator of said plurality of stators and the stator windings of the other stator and the power source.

8. A variable speed controlled induction motor according to claim 1, wherein said phase shifting means comprises means for rotating at least one stator of said plurality of stators with respect to the other stator on said common axis, whereby the displacement of phase angles of the voltages induced on the respective portions of said conductive members facing to said plurality of stators is continuously adjustable within the range from 0°–180°.

9. A variable speed controlled induction motor according to claim 1, wherein said phase shifting means comprises a plurality of phase changing switches provided between the stator windings of at least one stator of said plurality of stators and the stator windings of the other stator and the power source, whereby the displacement of phase angles of the voltages induced on the respective portions of said conductive members facing said plurality of stators is adjustable stepwise.

10. A variable speed controlled induction motor according to claim 1, wherein said phase shifting means comprises for rotating at least one stator of said plurality of stators with respect to the other stator on said common axis, and comprises a plurality of phase changing switches provided between the stator windings of at least one stator of said plurality of stators and the stator windings of the other stator and the power source.

11. A variable speed controlled induction motor according to claim 1, wherein said stator windings wound on the respective stator cores are provided with switches which enable the wire connection to be changed either to a delta-connection or to a star-connection.

12. A variable speed controlled induction motor according to claim 1, wherein said connecting members short-circuiting said conductive members at said air space or non-magnetic core portion are of a resistive material.

* * * * *

UNITED STATES PATENT AND TRADEMARK OFFICE
CERTIFICATE OF CORRECTION

PATENT NO. : 4,785,213

DATED : November 15, 1988

INVENTOR(S) : Toshihiko SATAKE

It is certified that error appears in the above-identified patent and that said Letters Patent is hereby corrected as shown below:

Replace Figs. 1, 13, and 19 in the patent as printed with attached Figs. 1, 13 and 19.

Column 1, line 20, change "and" to --cause--. Line 57, between "independent" and "the" insert -- of --.

Column 5, line 5, change "14" to --13--.
line 19, delete ", 22".

Figure 7:
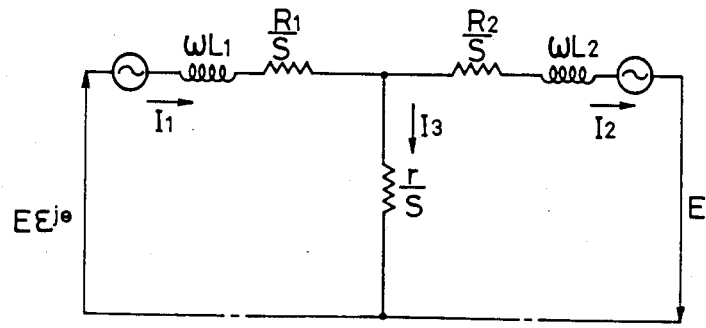
FIG. 7 shows an electric equivalent circuit of the rotor seen from the stator side.

Column 6, line 17, change "phase" to --phases--.
line 24, change "e2" to --$\dot{e}2$--.
line 28, change "e1" to --$\dot{e}1$--.
line 29, the equation should be -- $\dot{e}_1 = S\mathcal{E}\mathcal{E}^{i\theta}$ --.
line 64, change "FIG. 8" to --FIG. 7--.

Column 8, line 53, change "5" to --r--.

Column 9, line 50, between "S4," and "terminals" insert --S9, and--.

Column 16, line 51, after "long" insert --as--.

Column 18, line 23, change "and" to --grid--.

UNITED STATES PATENT AND TRADEMARK OFFICE
CERTIFICATE OF CORRECTION

PATENT NO. : 4,785,213

DATED : November 15, 1988

INVENTOR(S) : Toshihiko SATAKE

It is certified that error appears in the above-identified patent and that said Letters Patent is hereby corrected as shown below:

Claim 10, line 3, insert -- means -- after "comprises"

Signed and Sealed this

Twelfth Day of September, 1989

Attest:

DONALD J. QUIGG

*Attesting Officer*   *Commissioner of Patents and Trademarks*